(12) United States Patent
Noui-Mehidi (10) Patent No.: US 10,661,236 B2
(45) Date of Patent: May 26, 2020

(54) METHOD AND SYSTEM FOR BLENDING WELLBORE TREATMENT FLUIDS

(71) Applicant: SAUDI ARABIAN OIL COMPANY, Dhahran (SA)

(72) Inventor: Mohamed Nabil Noui-Mehidi, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 15/968,931

(22) Filed: May 2, 2018

(65) Prior Publication Data
US 2019/0336924 A1 Nov. 7, 2019

(51) Int. Cl.
*B01F 5/04* (2006.01)
*B01F 3/08* (2006.01)
*C09K 8/72* (2006.01)
*E21B 43/26* (2006.01)

(52) U.S. Cl.
CPC .......... *B01F 5/0428* (2013.01); *B01F 3/0811* (2013.01); *B01F 5/0423* (2013.01); *C09K 8/72* (2013.01); *E21B 43/26* (2013.01); *B01F 2215/0081* (2013.01)

(58) Field of Classification Search
None
See application file for complete search history.

(56) References Cited

U.S. PATENT DOCUMENTS

| | | | |
|---|---|---|---|
| 3,053,320 A * | 9/1962 | Steincamp | E21B 37/00 166/68 |
| 3,737,691 A | 6/1973 | Hoover | |
| 3,799,266 A | 3/1974 | Kiel | |
| 4,344,752 A * | 8/1982 | Gallagher, Jr. | B01F 5/0413 137/888 |

(Continued)

FOREIGN PATENT DOCUMENTS

| CA | 2534746 A1 | 7/2007 |
|---|---|---|
| CN | 101690879 A | 4/2010 |

(Continued)

OTHER PUBLICATIONS

International Search Report and Written Opinion for related PCT application PCT/US2019/030410 dated Jul. 29, 2019, 14 pages.

*Primary Examiner* — Anuradha Ahuja
(74) *Attorney, Agent, or Firm* — Bracewell LLP; Constance Rhebergen (57) ABSTRACT

A system and method for delivering a treatment fluid to a wellbore by emulsifying the treatment fluid with a continuous fluid in a flowline. The treatment and continuous fluids are combined in a mixer that is separate from containers that retain the fluids. In an example where the mixer is a venturi, the continuous fluid flows into an inlet on an entrance end of the venturi, and the treatment fluid flows into an inlet that is at a flow restriction in the venturi. The continuous fluid experiences a localized decrease in pressure at the restriction, which is due to a localized increase in flow rate at the restriction. The pressure decrease induces the treatment fluid (Continued)

into the venturi, where the treatment fluid is dispersed into droplets within the continuous fluid, and that forms a treatment emulsion. The treatment fluid escapes from within the treatment emulsion when in the wellbore.

10 Claims, 6 Drawing Sheets

(56) References Cited

U.S. PATENT DOCUMENTS

| | | | |
|---|---|---|---|
| 4,359,391 A | | 11/1982 | Salathiel et al. |
| 4,416,610 A | * | 11/1983 | Gallagher, Jr. ....... B01F 5/0413 137/888 |
| 4,526,633 A | | 7/1985 | Lawrence et al. |
| 5,055,175 A | | 10/1991 | Ng et al. |
| 6,284,714 B1 | * | 9/2001 | Bland .................... C09K 8/26 507/100 |
| 7,404,903 B2 | | 7/2008 | Bozak et al. |
| 7,652,074 B2 | * | 1/2010 | Varadaraj ............... C09K 8/58 507/202 |
| 8,841,116 B2 | | 9/2014 | Mathies et al. |
| 8,871,691 B2 | | 10/2014 | Rey et al. |
| 9,238,206 B2 | | 1/2016 | Rotem et al. |
| 2004/0008571 A1 | | 1/2004 | Coody et al. |
| 2004/0014821 A1 | * | 1/2004 | Varadaraj ................. C09K 8/58 516/53 |
| 2004/0211316 A1 | * | 10/2004 | Collins .................... C09K 8/52 95/153 |
| 2007/0056774 A9 | * | 3/2007 | Giroux ..................... E21B 7/06 175/61 |
| 2009/0073800 A1 | * | 3/2009 | Tarmann ............... B01F 5/0451 366/153.1 |
| 2011/0290492 A1 | * | 12/2011 | Hodgson ............... B01F 3/0807 166/305.1 |
| 2014/0284057 A1 | * | 9/2014 | Champagne .......... C09K 8/602 166/305.1 |
| 2016/0108697 A1 | * | 4/2016 | Abbad .................. E21B 21/003 166/292 |
| 2016/0264849 A1 | | 9/2016 | Oliveira et al. |
| 2017/0210979 A1 | | 7/2017 | Cairns et al. |
| 2017/0232407 A1 | | 8/2017 | Cobb |

FOREIGN PATENT DOCUMENTS

| | | |
|---|---|---|
| GB | 1221163 A | 2/1971 |
| WO | 2017019066 A1 | 2/2017 |

* cited by examiner

METHOD AND SYSTEM FOR BLENDING WELLBORE TREATMENT FLUIDS

BACKGROUND

1. Field

The present disclosure relates to blending wellbore treatment fluids. More specifically, the disclosure relates to blending the wellbore treatment fluids to create an emulsion prior to injecting downhole.

2. Related Art

Subterranean formations surrounding a hydrocarbon producing wellbores are sometimes treated to increase hydrocarbon production from the wellbores; where that treatment is sometimes referred to as well stimulation. Fluids, typically one of a fracturing fluid or a treatment fluid, are delivered into the particular wellbore during most well stimulation techniques. As their name implies, fracturing fluids are used to fracture the formation by subjecting the wellbore to a high fluid pressure. The fracturing fluid is delivered downhole at a pressure sufficient to overcome a yield strength of the formation, and thereby generate fractures in the formation that project radially outward from the wellbore. Some well stimulation fluids, such as surfactants, alter characteristics of fluids downhole. Other types of fluid delivered downhole can treat the formation itself by, for example, increasing permeability characteristics of the rock in the formation. Formation treatment usually dissolves material in the formation that restricts or blocks fluid flow through the formation. Examples of other fluids include those that are used to treat the wellbore and those which clean scale, rust, or other debris in the well that hinders fluid flow in the well itself.

Acids are often chosen for dissolving the formation, material in the formation, or material in the well which hinders fluid flow from the well. Acid is often dispersed in another fluid, such as diesel, to limit exposure of the acid to piping and other fluid-handling hardware. However, having the diesel as the continuous phase also has problems. Greater pumping power is required due to the friction losses resulting from the relatively large viscosity of diesel as compared to that of water.

SUMMARY

Disclosed is a method of operating a wellbore, which includes introducing a flow of a continuous fluid to an entrance of a venturi, introducing a flow of a treatment fluid to a portion of the venturi having a reduced cross-sectional flow area such that droplets of the treatment fluid found in and dispersed into the continuous fluid form a treatment emulsion, and introducing the treatment emulsion into a wellbore so that the droplets of the treatment fluid contact a subterranean formation adjacent to and in fluid communication with the wellbore. The method optionally includes diverting a portion of the treatment emulsion to a container having the continuous fluid. In this example, the portion of the treatment emulsion diverted to the container having the continuous fluid is generally within a designated radius from an axis of a flowline carrying the treatment emulsion. As well, the concentration in the droplets of the treatment fluid in the continuous fluid within the designated radius is less than the concentration of the treatment fluid in the continuous fluid that is outside of the designated radius. In one embodiment, the treatment fluid includes one or more of an acid, a stimulation acid, a surfactant, a viscoelastic surfactant, a salt, or a base. Examples of continuous fluid include water, diesel, kerosene, and combinations thereof. In an alternative embodiment, the treatment emulsion is a first treatment emulsion, the continuous fluid is a first continuous fluid, and the venturi is a first venturi. In such an embodiment, the method further includes directing a second continuous fluid to an entrance of a second venturi, and directing the first treatment emulsion to a portion of the second venturi having a reduced cross-sectional flow area so that droplets of the first treatment emulsion are dispersed in the second continuous fluid to form a second treatment emulsion. The embodiment method further includes directing the second treatment emulsion into the wellbore so that the droplets of the treatment fluid come into contact with subterranean formation adjacent the wellbore. In an example, the treatment fluid is an acid, the first continuous fluid is diesel, and the second continuous fluid is water. In an alternative embodiment example, a portion of a flow of the second treatment emulsion exiting the venturi is diverted back to a container housing the second continuous fluid. Optionally in this embodiment, the portion of the second treatment emulsion diverted to the second container is generally within a designated radius from an axis of a flowline carrying the second treatment emulsion, and where a concentration of the droplets of the treatment fluid in the second continuous fluid within the designated radius is less than a concentration of the treatment fluid in the second continuous fluid that is outside of the designated radius. In an alternative, the method further includes regulating a flow of the treatment emulsion based on sensing the treatment emulsion at a location downstream of the venturi.

Also disclosed is another example method of operating a wellbore, and which includes introducing a flow of a continuous fluid in a flow circuit, combining a flow of a treatment fluid with the continuous fluid in the flow circuit, blending the continuous fluid and the treatment fluid in a section of the flow circuit so that droplets of the treatment fluid become dispersed in the continuous fluid to form a flow of a treatment emulsion, diverting a portion of the flow of a treatment emulsion to a container having the continuous fluid, and introducing a remaining portion of the flow of a treatment emulsion into the wellbore. An example of the flow circuit includes piping and a venturi, and where the section of the flow circuit is the venturi. In an embodiment, the portion of the flow of a treatment emulsion that is diverted to the container having the continuous fluid is a concentration of droplets of the treatment fluid that is less than a concentration of droplets in the remaining portion. Embodiments exist that further include blending the treatment emulsion with another continuous fluid to form a complex emulsion that comprises droplets of the treatment emulsion in the continuous fluid.

An example of a system for operating in a wellbore is also described, and which includes a mixer having a dispersed flow inlet that receives a flow of a dispersed fluid that includes a wellbore treatment fluid, a continuous flow inlet that receives a flow of a continuous fluid and that is oriented so that in the mixer the flow of a dispersed fluid intersects with the flow of a continuous fluid to form an emulsion comprising droplets of the dispersed fluid scattered within the continuous fluid, and an exit having the emulsion. The system of this example also includes an exit line having an end in communication with the exit and an end in communication with the wellbore, and that is for carrying the emulsion. In an embodiment the mixer includes a venturi having a body, a bore extending axially through the body, and a restriction in the bore, where the continuous flow inlet coincides with an end of the bore, and where the dispersed flow inlet intersects with the restriction. In an alternative, the exit line extends into the wellbore to define a treatment line, the system further including a return line having an inlet in a mid-section of the treatment line and that receives a portion of the treatment emulsion flowing in the treatment line having a concentration of droplets of the dispersed fluid that is less than a portion of the treatment emulsion that flows past the inlet of the return line. In an alternate embodiment, another mixer is included with the system and which includes another dispersed fluid inlet in communication with the exit line, another continuous fluid inlet in communication with another continuous fluid so that a complex emulsion is formed in the another mixer that has droplets of the emulsion in the another continuous fluid and which defines a treatment emulsion, and another exit having the treatment emulsion. In this example, the system further optionally includes a treatment line having an end in communication with the another exit and that is for delivering the treatment emulsion into the wellbore.

BRIEF DESCRIPTION OF DRAWINGS

Some of the features and benefits of that in the present disclosure having been stated, and others will become apparent as the description proceeds when taken in conjunction with the accompanying drawings, in which.

DETAILED DESCRIPTION

The method and system of the present disclosure will now be described more fully after with reference to the accompanying drawings in which embodiments are shown. The method and system of the present disclosure may be in many different forms and should not be construed as limited to the illustrated embodiments set forth; rather, these embodiments are provided so that this disclosure will be thorough, complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, materials, or embodiments shown and described. Modifications and equivalents will be apparent to one skilled in the art. Illustrative examples have been disclosed in the drawings and specification. Although specific terms are employed they are used in a generic and descriptive sense only and not for the purpose of limitation.

Figure 1:
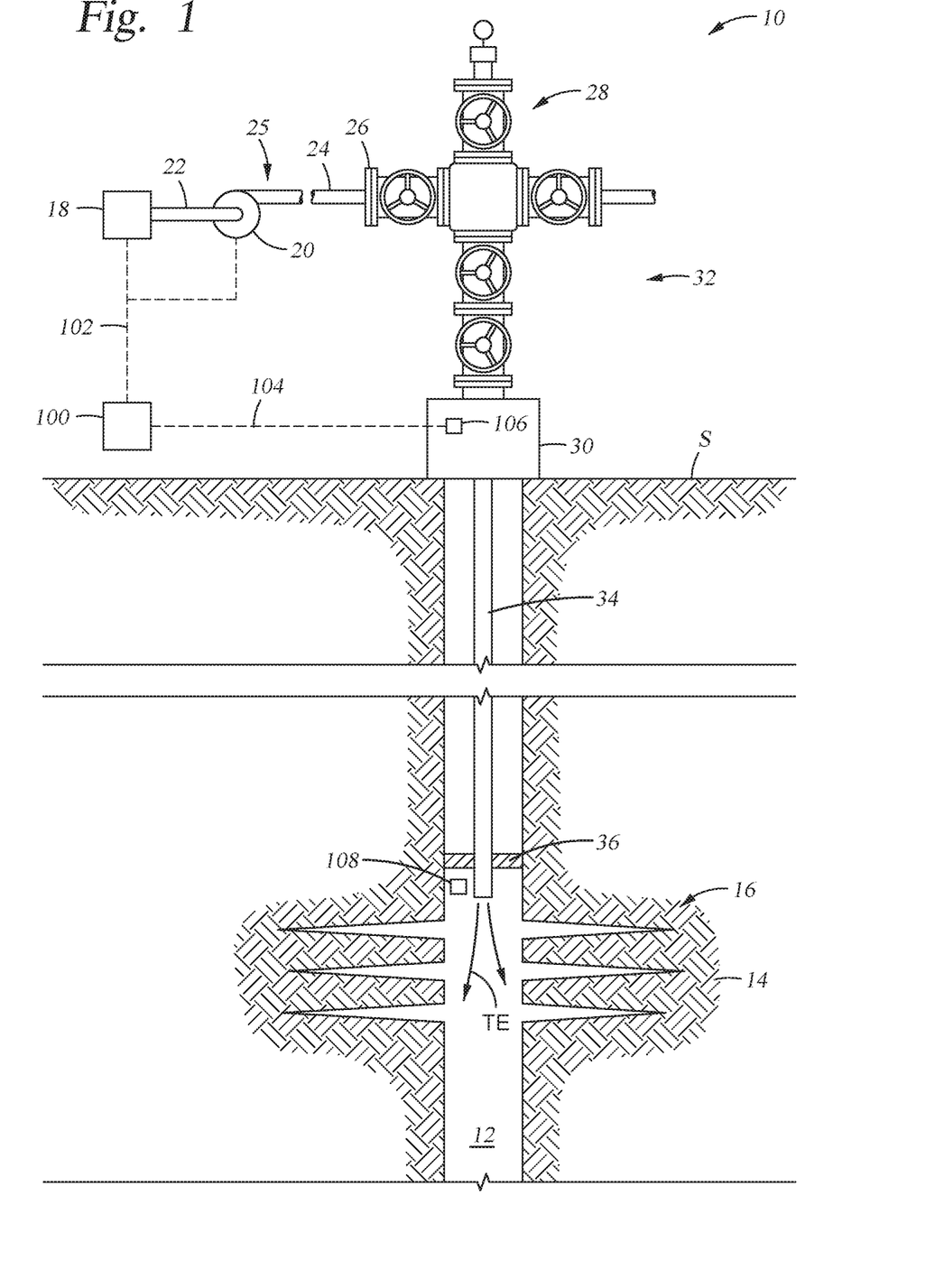
FIG. 1 is an elevational partial sectional view of a system for introducing a treatment emulsion into a wellbore.

Depicted FIG. 1 is an example of a wellbore treatment system 10 shown supplying a treatment emulsion TE into a wellbore 12. The treatment emulsion TE of this example includes a treatment fluid for treating a formation 14 that surrounds wellbore 12. The treatment emulsion TE of FIG. 1 enters into perforations 16 shown projecting radially outward from wellbore 12 and into formation 14. Included with the illustrated embodiment of the wellbore treatment system 10 is a fluid source 18 for the treatment emulsion TE; which is schematically represented on surface S and outside the wellbore 12. An optional pump 20, also on surface S, is shown as receiving treatment emulsion TE from fluid source 18 via a suction line 22. Treatment emulsion TE is pressurized in pump 20, and discharged from pump 20 into discharge line 24 at a pressure of increased magnitude over that within suction line 22. In an alternative the combination of suction line 22 and discharge line 24 define a treatment line 25. In the illustrated example, an end of discharge line 24 distal from pump 20 terminates at a wing connection 26 of a production tree 28. Production tree 28 of FIG. 1 mounts onto a wellhead housing 30, the combination of which define a wellhead assembly 32. A string of tubing 34, coupled with wellhead assembly 32 and projecting into the wellbore 12, is operable to deliver the treatment emulsion TE into the wellbore 12. In embodiments where the treatment emulsion TE includes an acid, channels and paths (not shown) are generated in the formation 14, which increases hydrocarbon drainage from formation 14 into wellbore 12. An optional packer is shown installed in an annular space between the tubing 34 and sidewalls of wellbore 12. Packer 36 defines a flow barrier in the annular space so that the treatment emulsion TE is contained below the packer 36 and within a designated portion within wellbore 12.

Figure 2A:
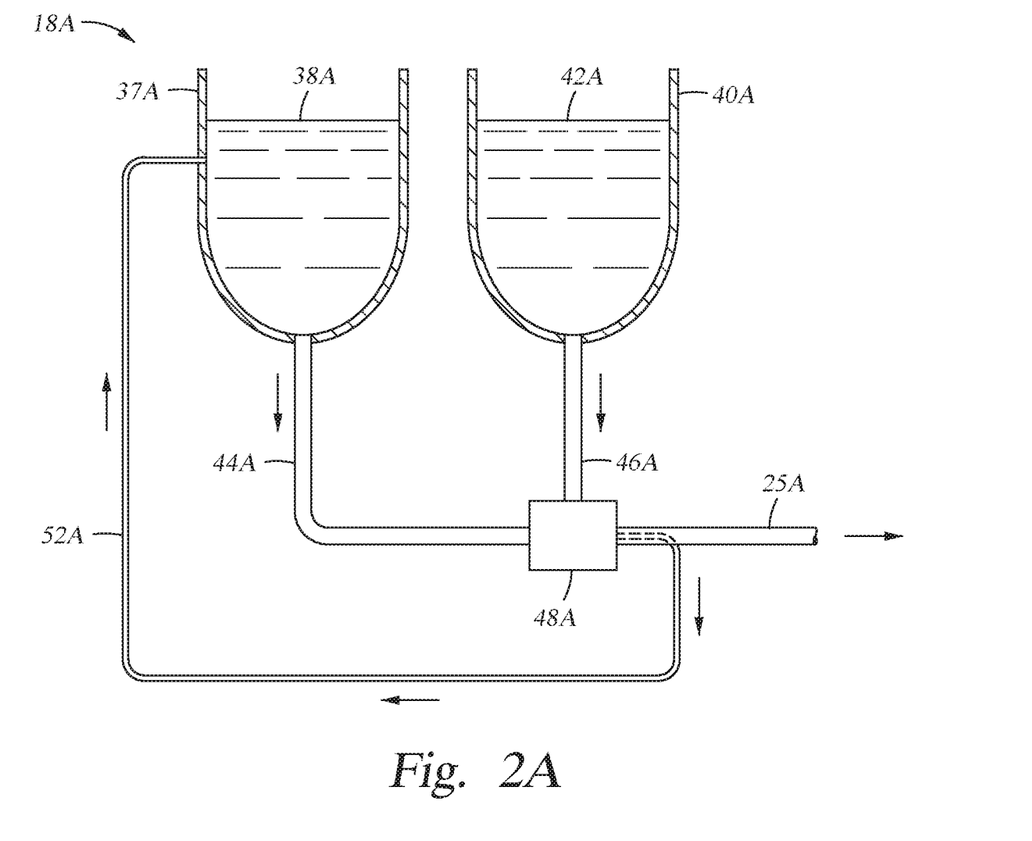
FIG. 2A is a schematic view of an embodiment of a system for forming a downhole treatment emulsion.

An embodiment of fluid source 18A is schematically represented in FIG. 2A. Fluid source 18A includes a container in which a continuous fluid is stored. Another container is included with the embodiment which treatment fluid is stored. As described in more detail, embodiments exist where continuous fluid 38A and treatment fluid 42A are constituents of the treatment emulsion TE of FIG. 1. In a more specific embodiment, constituents of treatment fluid 42A are delivered into the wellbore 12 to affect the wellbore 12 and/or surrounding formation 14 in a designated manner. Lines 44A, 46A respectively couple containers 37A, 40A to a mixer 48A.

Figure 2B:
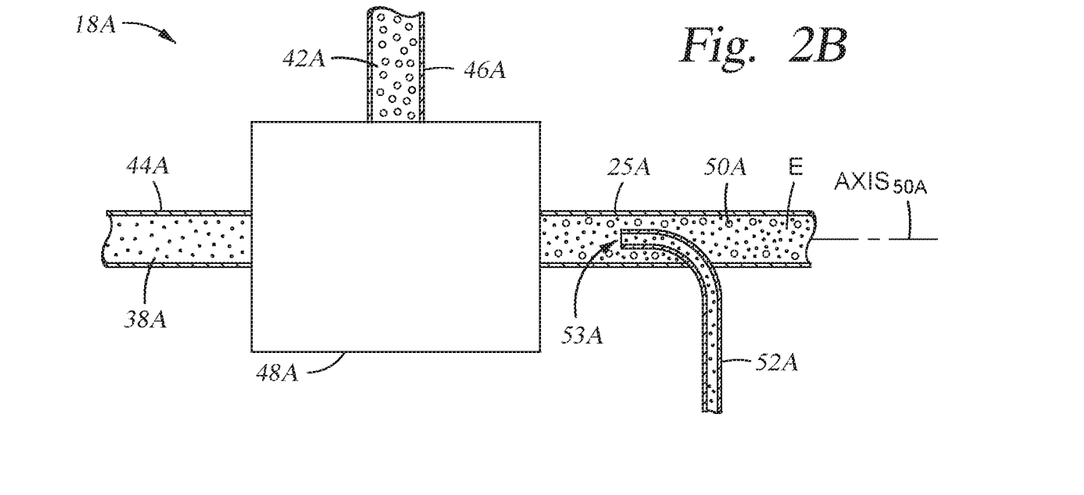
FIG. 2B is a schematic view of an embodiment of a mixer in the system of FIG. 2A.

FIG. 2B represents a portion of the fluid source 18A, and illustrates lines 44A, 46A being generally oblique to one another when connected to mixer 48A. Fluids 38A, 42A in lines 44A, 46A, respectively, are introduced into and combined with each other in mixer 48A. Combining fluids 38A, 42A forms an emulsion E having droplets 50A of the treatment fluid 42A distributed within the continuous fluid 38A. Emulsion E passes from mixer 48A into treatment line 25A, which is coupled to an exit of the mixer 48A. In this illustrated example, treatment line 25A extends along an axis A50A that is generally parallel with line 44A and oblique or perpendicular with line 46A. By orienting line 46A at a perpendicular or oblique angle with that of line 44A, shear forces are created within mixer 48A due to the introduction of treatment fluid 42A into continuous fluid 38A. The slowing of one fluid against the other enhances the formation of droplets 50A with emulsion E.

Further illustrated in FIGS. 2A and 2B is an optional return line 52A for returning a portion of fluid within treatment line 25A back to continuous fluid container 37A. In the embodiment shown in FIG. 2B, return line 52A intersects a sidewall of treatment line 25A, and is generally oblique with axis $A_{50A}$ when outside of treatment line 25A. Within treatment line 25A, return line 52A curves from an orientation that is oblique to treatment line 25A to an orientation that is substantially parallel with treatment line 25A. An end of return line 52A within treatment line 25A is open and facing upstream, defining an inlet 53A. Inlet 53A is selectively operable to receive a portion of fluid exiting mixer 48A. Not intending to be bound by theory, it is believed that in some instances droplets 50A tend to congregate towards the outer radius of the treatment line 25A and spaced away from axis $Axis_{50A}$, and which is thought to be attributable to the velocity of fluid 38A being greater than that of fluid 42A. Accordingly, in the illustrated embodiment inlet 53A is strategically located generally coaxial with axis $Axis_{50A}$ so that the fluid entering return line 52A is substantially comprising of the continuous fluid 38A and is substantially free of droplets 50A. In one embodiment, adding return line 52A maximizes a quantity and/or concentration of droplets 50A in emulsion E. Return line 52A also reduces unnecessary usage of continuous fluid 38A by returning an amount of continuous fluid 38A from within line 25A in which little or no droplets 50A are dispersed. Embodiments exist where an axis of inlet 53A is offset from axis $A_{50A}$, and where return line 52A is not curved. In an example, a diameter of return line 52A ranges from about 30% to about 80% of a diameter of treatment line 25A. In an example, a criteria for determining a size of return line 52A is to capture continuous fluid 38A in which droplets 50A have not formed or become entrained. In an alternate embodiment, inlet 53A to return line 52A is placed at or proximate to the downstream terminal end of restriction 62A. In an example embodiment, restriction 62A has a length that is substantially the same as a diameter of restriction 62A, alternatively, length of restriction 62A ranges from about one-half the diameter of restriction 62A to about that of the diameter of restriction 62A. In such an embodiment, inlet 53A to return line 52A within body 60A of venturi 54A is positioned a distance downstream of the end of restriction 62A up to about a distance substantially equal to a diameter of line 44A, and all distances between. In an embodiment, axial distance between restriction 62A and inlet 53A is dependent on flowrates of fluid within lines 44A, 46A, and is within the capabilities of one skilled to identify a designated distance based on the flowrates. In an alternate embodiment, inlet to line 44A is elevated from a lowermost portion of continuous fluid container 37A to avoid receiving any treatment fluid 42A inadvertently transferred to continuous fluid container 37A via return line 52A Referring now to FIG. 2C, schematically represented is an example of mixer 48A configured with a venturi 54A. In this example, a motive fluid inlet 56A is provided on an upstream end of venturi 54A, and coupled to line 44A. In this example, motive fluid inlet 56A couples to and receives continuous fluid 38A from continuous fluid container 37A of FIG. 2A. An outlet 58A is formed on a downstream end of venturi 54A distal from motive fluid inlet 56A, and couples to treatment line 25A. Venturi 54A includes a body 60A having a bore that extends axially through, the length of body 60A. A restriction 62A, comprising part of the body 60A between the inlet and outlet 56A, 58A defines a reduced cross sectional area of bore. Fluid flowing through venturi 54A experiences a localized increase in velocity, and a corresponding reduction in pressure when traversing the restriction 62A of body 60A.

Figure 2C:
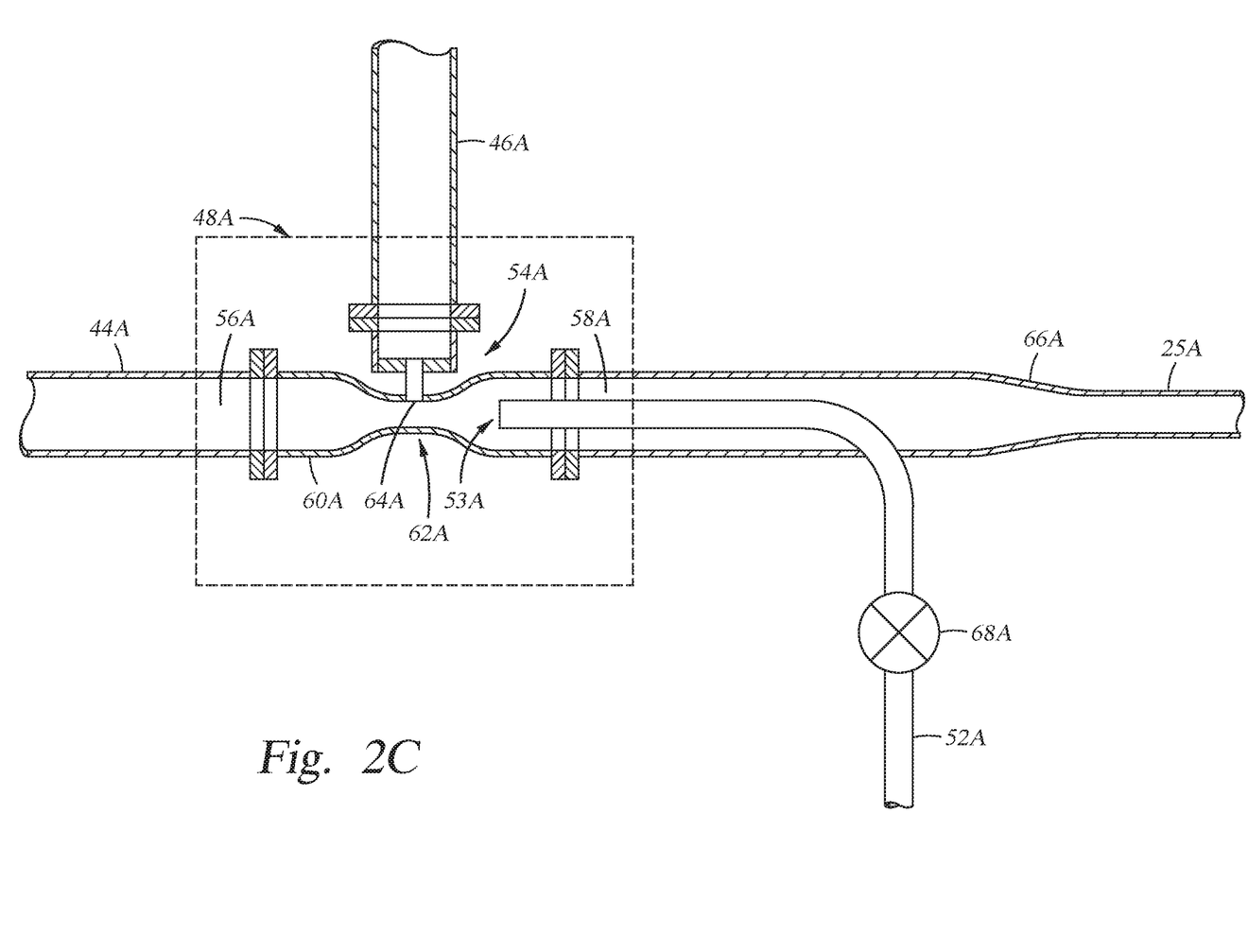
FIG. 2C is a side view of an alternate embodiment of a mixer in the system of FIG. 2A.

A dispersed fluid inlet 64A is illustrated showing line 46A coupled to line 44A at restriction 62A Alternative embodiments exist where two or more dispersed fluid inlets 64A are provided around a circumference of body 60A and which introduce treatment fluid 42A along different azimuthal locations around a flow of continuous fluid 38A inside venturi 54A. The reduced pressure within the restriction 62A provides a pressure differential between line 46A and restriction 62A such that treatment fluid 42A is drawn into venturi 54A from line. Not to be bound by theory, but it is believed that the increased fluid velocity within restriction 62A of continuous fluid 30A shearing against the treatment fluid 42 leads to the formation of more homogeneously dispersed droplets 50A within the continuous fluid 38A than merely a similar T-junction style system of feeding fluid into the system. Example materials for the treatment fluid include acid, a stimulation acid, a surfactant, a viscoelastic surfactant, a salt, a base, and combinations thereof. Examples of continuous fluid 38A include organic liquids, water, diesel, kerosene, and combinations thereof.

Example volumetric ratios of the droplets 50A of treatment fluid 42A to continuous fluid 38A range from about 1:3 to about 1:6. In one embodiment, a particular quantity of treatment fluid 42A is a mass or volumetric rate of treatment fluid 42A to be mixed with continuous fluid 38A in venturi 54A so that a designated size and quantity of droplets 50A are in the emulsion E. In certain embodiments, droplets 50A have an average diameter that ranges from about 100 microns to about 1 millimeter. Further embodiments exist where an average diameter of droplets 50A ranges between around 1 millimeter to about 3 millimeters. It is believed it is within the capabilities of those skilled in the art to identify a designated size and quantity of droplets 50A and a particular quantity of treatment fluid 42A. A pump (not shown) is alternatively included for driving treatment fluid 42A through dispersed fluid inlet 64A, such as for example when a pressure differential between tank 40A and venturi 54A is insufficient for a particular quantity of treatment fluid 42A from tank 40A to enter venturi 54A. In another alternative, a pump (not shown) is included for pressurizing fluid in line 52A sufficient for return to continuous fluid container 37A.

Further shown in the example of FIG. 2C, an optional swage 66A is shown formed downstream of venturi 54A which provides a diameter transition to the treatment line 25A.

In an alternative, a valve 68A is provided in return line 52A. The valve 68A is configured to regulate or control a flow rate of the fluid flowing into and thru return line 52A. An advantage of dispersing the treatment fluid 42A within the continuous fluid 38A is that the treatment fluid 42A is kept separate from and out of contact with fluid handling equipment, such as pumps or pipes, when being transported into wellbore 12 (FIG. 1). By emulsifying the treatment fluid 42A within continuous fluid 38A, interaction between the potentially harmful treatment fluid 42A and fluids handling equipment is substantially diminished.

Figure 3A:
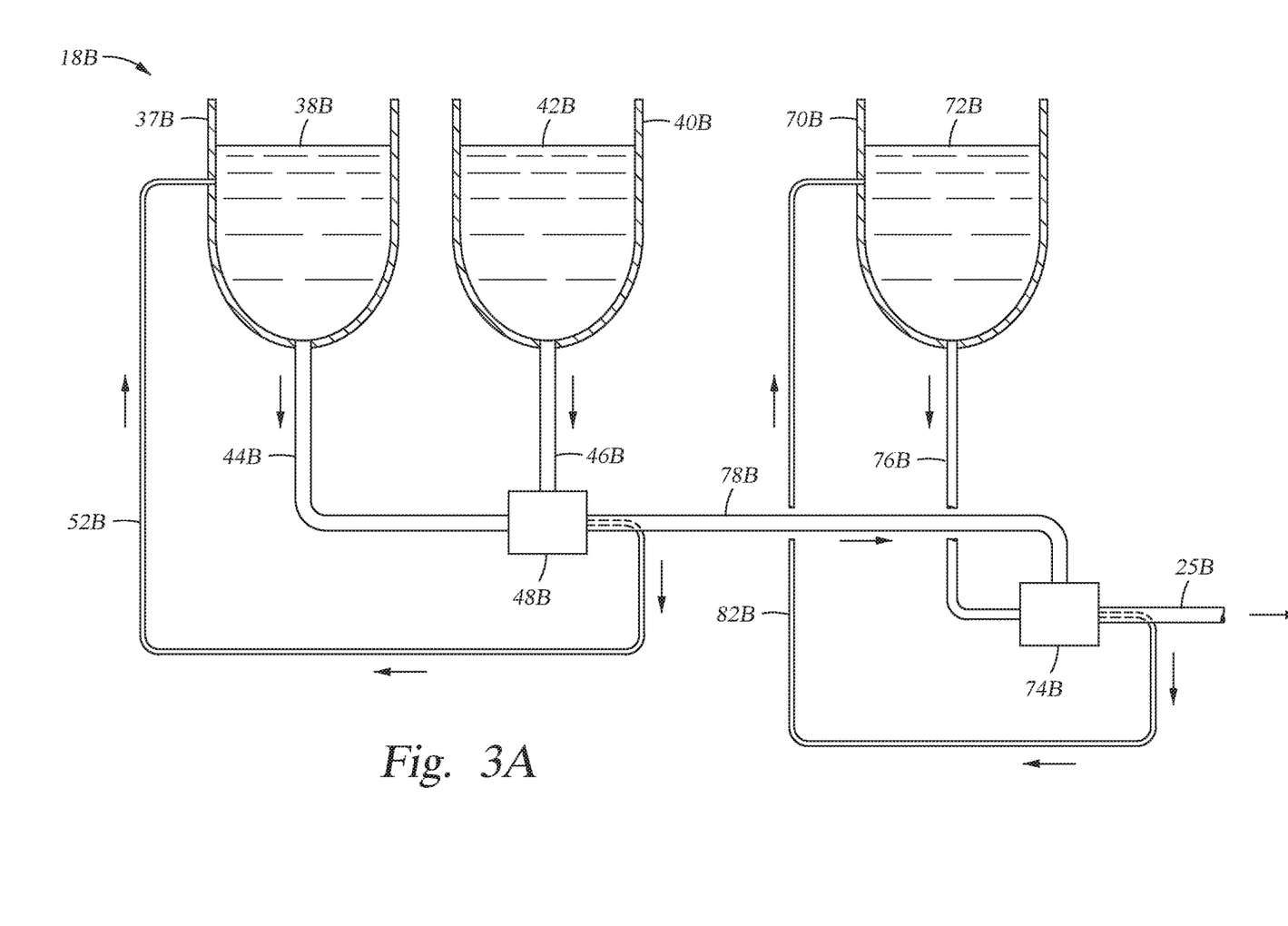
FIG. 3A is a schematic view of an alternate embodiment of a system for forming a downhole treatment emulsion.
Figure 3B:
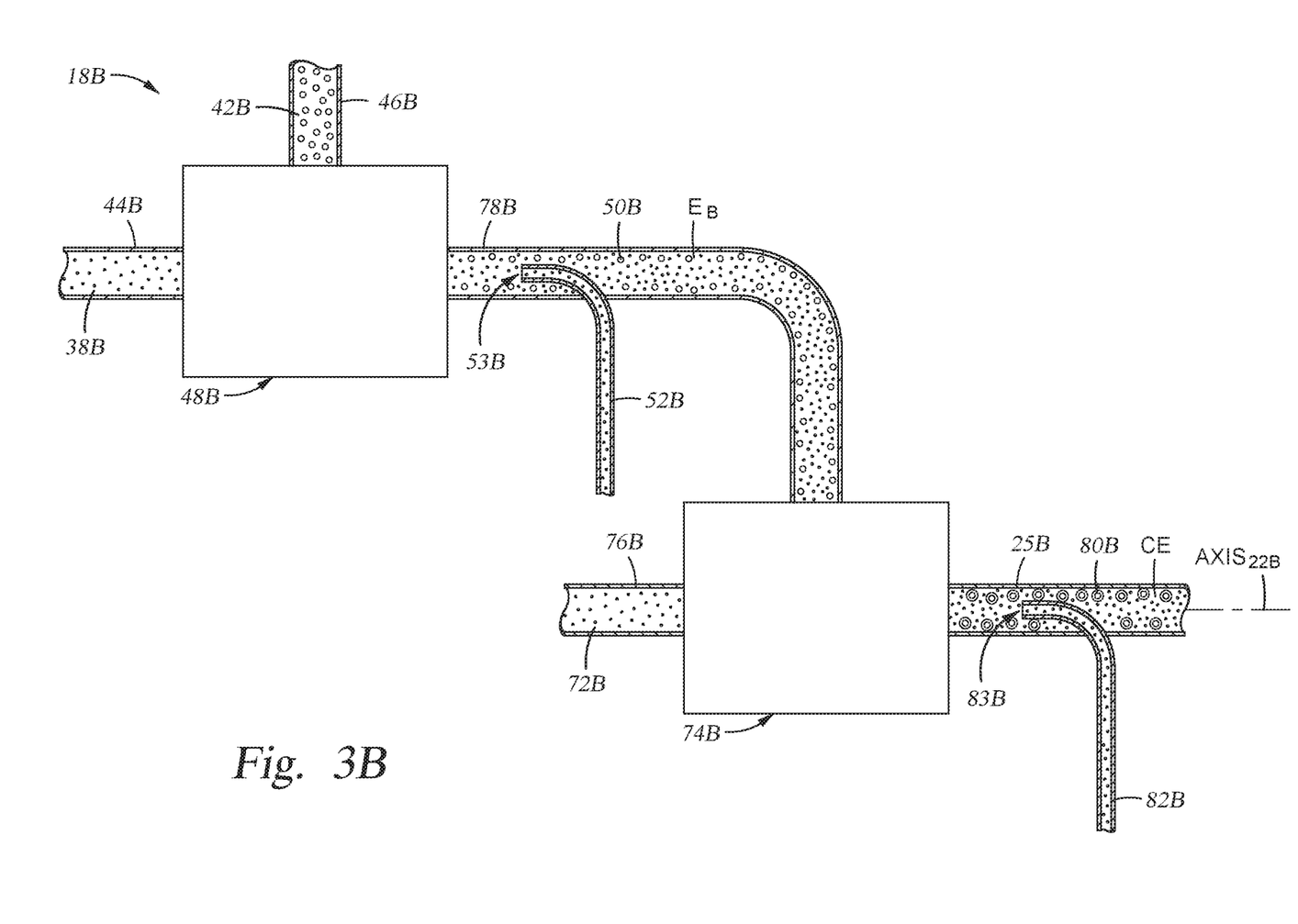
FIG. 3B is a schematic view of an embodiment of mixers in the system of FIG. 3A.

Referring now to FIG. 3A, schematically shown is an alternate embodiment of a fluid source 18B. In this example, in additional to containers 37B, 40B, another container 70B is schematically represented containing another continuous fluid 72B, where continuous fluid 72B flows to another mixer 74B via line 76B. Similar to the embodiments of FIGS. 2A and 2B, continuous fluid 38B from container 37B and treatment fluid 42B from container 40B are combined in mixer 48B. Line 78B connects between mixer 48B and mixer 78B and provides a conduit for fluid leaving mixer 48B to enter mixer 74B. The blended result of mixing within mixer 74B is discharged into treatment line 25B. Similar to mixer 48A of FIG. 2B, an emulsion $E_B$ is formed by combining fluids 38B, 42B in mixer 48B (FIG. 3B). Emulsion $E_B$ is delivered to mixer 74B from mixer 48B via line 78B, and in which it is combined with continuous fluid 72B. Further schematically illustrated in the example of FIG. 3B are droplets 50B in emulsion $E_B$ that are dispersed within the continuous fluid 38B, and being directed towards mixer 74B through line 78B. In the example of FIG. 3B, the emulsion $E_B$ within line 78B combines with and becomes dispersed within continuous fluid 72B inside mixer 74B and creates a complex emulsion CE shown exiting mixer 74B and in line 25B. Included within the example of complex emulsion CE of FIG. 3B are droplets 80B; where droplets 80B include an inner portion that is made up of the treatment fluid 42A of FIG. 2A, and an outer portion is made up of the continuous fluid 38A of FIG. 2A. A return line 82B is shown having an inlet end disposed within treatment line 25B and proximate an axis $Axis_{22B}$ of treatment line 25B. Similar to return line 52A of FIG. 2B, inlet end of return line 82B is strategically located in treatment line 25B so that a large portion of fluid within return line 82B is made up of continuous fluid 72B. In an example, a viscosity of continuous fluid 72B is less than a viscosity of the continuous fluid 38B in which the treatment fluid 42B is emulsified, which provides an advantage of reduced resistance to flow when directing the complex emulsion CE into a wellbore 12 (FIG. 1), thereby lessening energy, and thus costs, associated with flowing or pumping the complex emulsion CE.

Figure 3C:
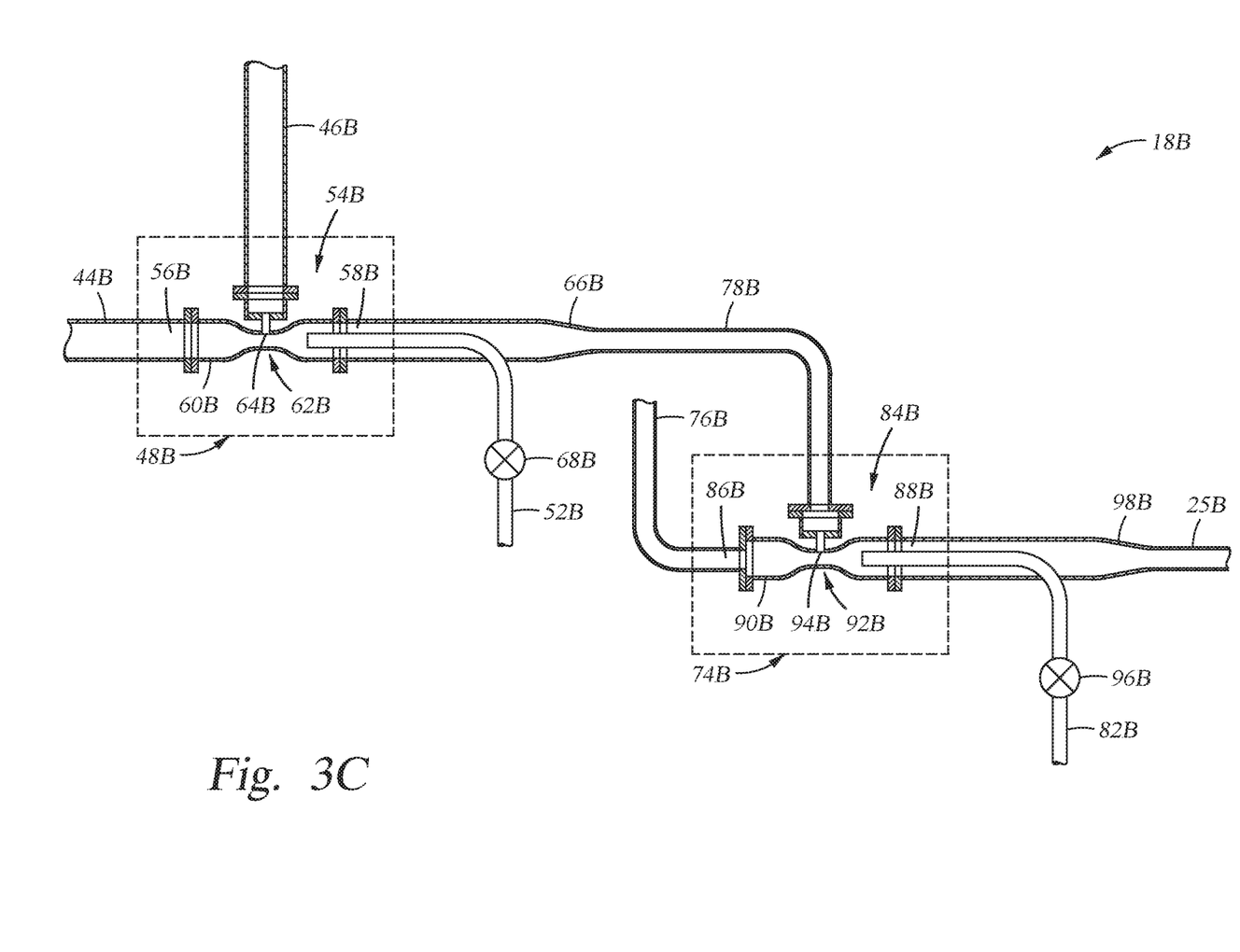
FIG. 3C is a side view of an alternate embodiment of mixers in the system of FIG. 3A.

In FIG. 3C shown in schematic form is an example of a portion of fluid source 18B, and which includes mixers 54B, 74B. In the example of FIG. 3C, each of the mixers 48B, 74B is configured as a venturi 64B, 84B. A motive fluid inlet 86B is provided on venturi 84B, and which connects to an end of line 76B. In this example, continuous fluid 72B flowing into venturi 84B provides a motive source for the emulsion $E_B$ flowing into venturi 84B via line 78B. An outlet 88B is shown disposed on an end of venturi 84B distal from motive fluid inlet 86B. Venturi 84B includes a body 90B having opposing ends at the inlet and outlet 86B, 88B and a restriction 92B shown formed along a portion of body 90B. Like venturi 54B, venturi 84B includes an axial bore which has a reduced cross sectional area to define restriction 92B. The reduced cross sectional area of restriction 92B generates a localized velocity decrease, and thus localized drop of pressure, of fluid flowing through venturi 84B. The temporary rise in velocity of fluid flowing through venturi 84B provides enhanced mixing of fluids combined in venturi 84B. In this example, dispersed fluid inlet 94B is positioned proximate the restriction 92B and through which emulsion $E_B$ is directed into venturi 84B. In an example, dispersed fluid inlet 94B is at a mid-point of an axial length of the restriction 92B. Valve 96B is illustrated disposed within return line 82B, and which in one example selectively controls the flow of the continuous fluid 72B back to the container 70B and through return line 82B. Swage 98B is one example of connection between outlet 88B and treatment line 25B. Examples of continuous fluid 72B include an organic liquid, water, diesel, kerosene, and, variations thereof.

Referring back to FIG. 1, shown is an optional controller 100 that is in communication with fluid source 18 and pump 20 via communication means 102. Examples of communication means 102 include electrically conducting media, fiber optic material, telemetry, electromagnetic waves, and wireless. Additionally, communication means 104 is optionally shown connected to controller 100 and for providing communication between controller 100 and sensor 106 disposed within wellhead housing 30. Alternatively, another sensor 108 is depicted disposed within wellbore 12 and in optional communication with controller 100 via communication means 104. In one example of operation, conditions within wellbore 12 and/or wellhead housing 30 are sensed by sensors 106, 108 which is then relayed to controller 100. Optional commands are stored within controller 100 that are manually input in response to indications of measured conditions within wellbore 12 of wellhead housing 30, and which control the flow of fluids through the wellbore treatment system 10. Example ways of controlling the flow is the operation of pump 20, as well as selective opening and closing of valves 68B, 96B. In an alternate embodiment, one of or both sensors 106, 108 monitor characteristics of the treatment emulsion TE and provide feedback to controller 100. In one example, feedback to controller 100 having characteristics of the treatment emulsion TE includes information about respective constituents in the treatment emulsion TE and their relative volumetric and/or mass percentages. Further optionally, characteristics of the treatment emulsion TE includes information about droplets 80B (FIG. 3B), such as their spatial location in a flow the treatment emulsion TE. Alternatively, information about the droplets 80B includes identification of compounds on their outer surface to ensure the droplets 80B have been properly formed, so that corrosive or other damaging compounds are blocked from contact with hardware susceptible to damage from those compounds. In one non-limiting embodiment, flow within fluid source 18 is adjusted based on feedback from sensors 106, 108. Examples of adjusting flow within fluid source 18 includes changing a flow to or from mixers 48B, 74B, such as in one or more of lines 25B, 44B, 46B, 52B, 76B, 78B, and 82B. In an example, emulsion E of FIG. 2B is directed introduced into the wellbore 12 (FIG. 1), thus in this example emulsion E is the treatment emulsion TE. In another example, complex emulsion CE of FIG. 3B is introduced into the wellbore 12 (FIG. 1), thus in this example complex emulsion CE is the treatment emulsion TE.

The present disclosure therefore is well adapted to carry out the objects and attain the ends and advantages mentioned, as well as others inherent. While embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A method of operating a wellbore comprising:
    obtaining a venturi having an entrance and a reduced cross-sectional flow area downstream of the entrance;
    introducing a flow of a continuous phase fluid to the entrance of the venturi;
    dispersing droplets of a treatment fluid into the continuous phase fluid to form a treatment emulsion by introducing the flow of the continuous phase fluid to the entrance of the venturi, and introducing a flow of the treatment fluid to an inlet intersecting the reduced cross-sectional flow area;
    maximizing a concentration of the treatment fluid in the treatment emulsion by diverting a portion of the treatment emulsion to a container having the continuous phase fluid; and then
    introducing the treatment emulsion with the maximized concentration of treatment fluid into the wellbore so that the droplets of the treatment fluid contact with a subterranean formation adjacent to and in fluid communication with the wellbore.

2. The method of claim 1, where the portion of the treatment emulsion diverted to the container having the continuous phase fluid is within a designated radius from an axis of a flowline carrying the treatment emulsion, and where a concentration of the droplets of the treatment fluid in the continuous phase fluid within the designated radius is less than a concentration of droplets of the treatment fluid in the continuous phase fluid that is outside of the designated radius.

3. The method of claim 1, where the treatment fluid comprises a material selected from the group consisting of an acid, a stimulation acid, a surfactant, a viscoelastic surfactant, a salt, a base, and combinations thereof.

4. The method of claim 1, where the continuous phase fluid comprises a material selected from the group consisting of an organic liquid, water, diesel, kerosene, and combinations thereof.

5. The method of claim 1, further comprising regulating a flow of the treatment emulsion based on sensing the treatment emulsion at a location downstream of the venturi.

6. A method of operating a wellbore comprising:
   introducing a flow of a continuous phase fluid to an entrance of a venturi;
   combining a flow of a treatment fluid with the continuous phase fluid in a reduced cross-sectional flow area of the venturi downstream of the entrance;
   blending the continuous phase fluid and the treatment fluid so that droplets of the treatment fluid become dispersed in the continuous phase fluid to form a flow of a treatment emulsion that has a first portion, and that has a second portion with a concentration of the droplets of the treatment fluid that is greater than that of the first portion;
   maximizing a concentration of the treatment fluid in the flow of the treatment emulsion by diverting the first portion to a container having the continuous phase fluid; and then
   introducing the second portion into the wellbore.

7. The method of claim 6, where the treatment fluid is an emulsion formed by emulsifying a first treatment fluid in a first continuous phase fluid prior to the step of blending, and where the treatment emulsion is a complex emulsion.

8. The method of claim 7, where the complex emulsion comprise an acid in diesel in water emulsion.

9. The method of claim 6, wherein the step of diverting comprises disposing an inlet to a return line inside piping downstream of the venturi, and positioning the inlet coaxial with an axis of the piping.

10. The method of claim 9, wherein a diameter of the return line ranges from about 30% to about 80% of a diameter of the piping downstream of the venturi.

* * * * *